United States Patent [19]

Schmitt, deceased et al.

[11] 4,448,530

[45] May 15, 1984

[54] SPECTROPHOTOMETER

[76] Inventors: Albert Schmitt, deceased, late of Überlingen, Fed. Rep. of Germany; by Magdalena S. Schmitt, heir, Gasserswies 14, 7770 Überlingen, Fed. Rep. of Germany; by Thomas Schmitt, heir, Gasserswies 14, 7770 Überlingen, Fed. Rep. of Germany; by Martin Schmitt, heir, Gasserswies 14, 7770 Überlingen, Fed. Rep. of Germany; by Georg Schmitt, heir, Gasserswies 14, 7770 Überlingen, Fed. Rep. of Germany; by Annette Schmitt, heir, Gasserswies 14, 7770 Überlingen, Fed. Rep. of Germany; Ernst Spreitzhofer, Zum Kretzer 4, 7770 Überlingen, Fed. Rep. of Germany

[21] Appl. No.: 237,308

[22] Filed: Feb. 23, 1981

[30] Foreign Application Priority Data

Mar. 5, 1980 [DE] Fed. Rep. of Germany ....... 3008345

[51] Int. Cl.³ .............................................. G01J 3/42
[52] U.S. Cl. ..................................... 356/320; 356/326
[58] Field of Search ............... 356/326, 303, 320, 328, 356/319, 321, 322, 323, 324, 325, 434

[56] References Cited

U.S. PATENT DOCUMENTS

| 3,737,234 | 6/1973 | Shibata et al. | 356/326 |
| 3,887,281 | 6/1975 | Kurita et al. | 356/325 |
| 4,076,424 | 2/1978 | Ida | 356/434 X |
| 4,136,959 | 1/1979 | Honkawa et al. | 356/320 X |

FOREIGN PATENT DOCUMENTS 54-0131985 10/1979 Japan ................................. 356/320

OTHER PUBLICATIONS

Perregaux et al., "A Simple Technique for a Wavelength Mod. of Optical Spectra", Applied Opt., vol. 7, #10, 1968.

Primary Examiner—F. L. Evans
Assistant Examiner—L. A. Dietert
Attorney, Agent, or Firm—F. L. Masselle; E. T. Grimes; R. A. Hays

[57] ABSTRACT

A spectrophotometer producing a derivative spectrum of a looked-for component of a sample includes means for producing an output signal which is directly representative of the concentration of the looked-for element.

2 Claims, 4 Drawing Figures

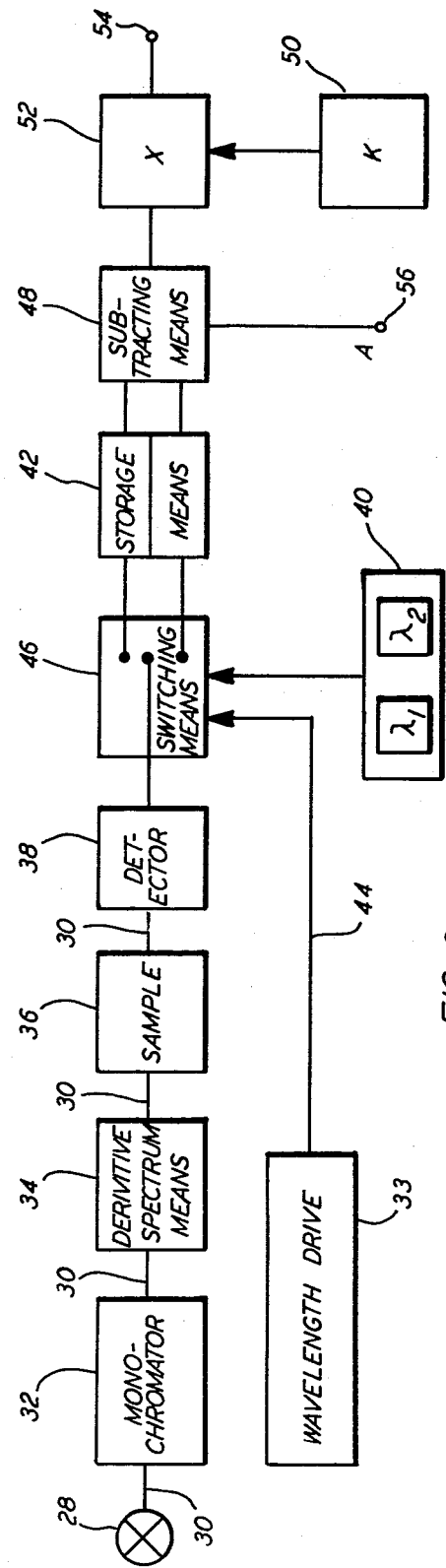
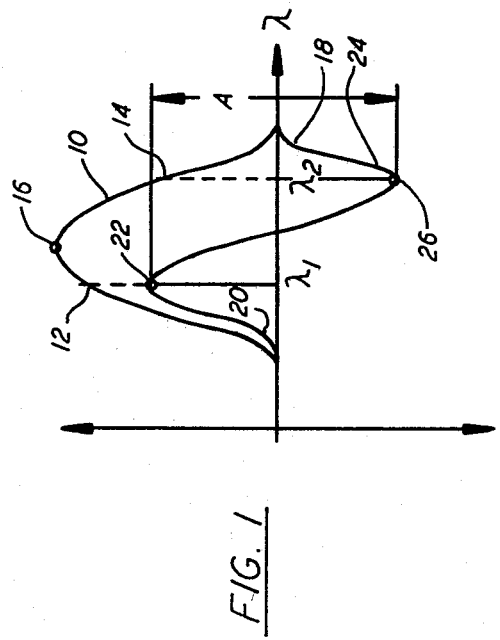
FIG. 2
FIG. 1

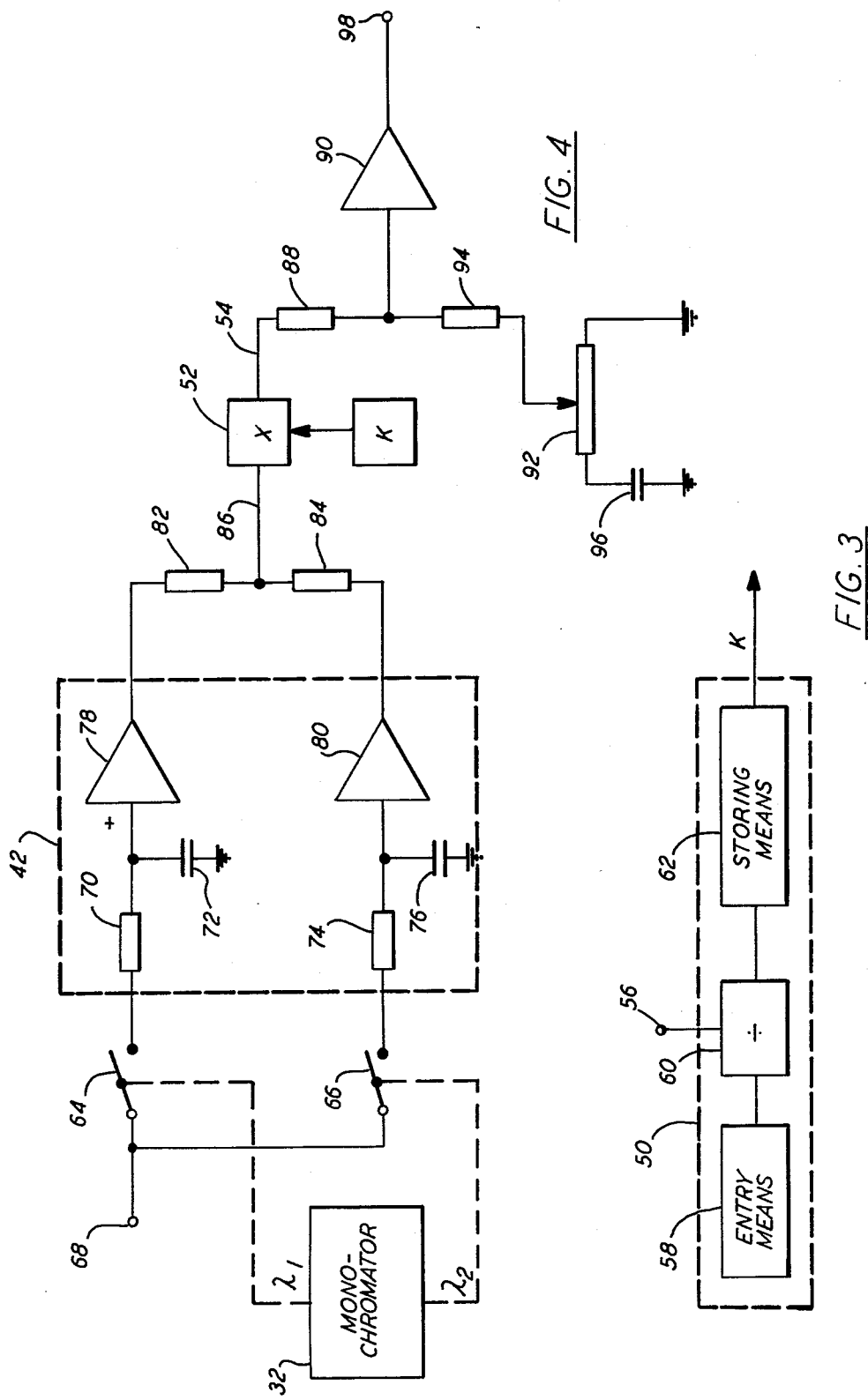

SPECTROPHOTOMETER

The invention relates to a spectrophotometer for determining the concentration of a looked-for component of a sample from a derivative spectrum comprising:
(a) a monochromator with a wave length drive for scanning a wave length range,
(b) means for producing a derivative spectrum and
(c) a detector arrangement for producing a signal, which provides the derivative spectrum as function of the wave length defined by the wave length drive.

A spectrophotometer, with which a derivative spectrum is produced, that is a signal, which represents the derivative of the derivative with respect to the wave length as a function of the wave length is known by the publication by Perregaux and Ascarelli "A Simple Technique for Wavelength Modulation of Optical Spectra" in "Applied Optics" volume 7 (1968), 2031. From such a derivative spectrum, lines can be recognized even with strong background. Also weak bands near stronger bands become recognizable, which bands would appear only slightly in a normal spectrum.

An absorption band, which occurs, for example as a bell-shaped curve, in a normal spectrum, that is in the function of absorption or transmission versus wave length, provides, in the derivative spectrum a first peak with one sign and a subsequent second peak with opposite sign. The zero passage there between corresponds to the maximum of the bell-shaped curve. The maximum of one peak and the maximum of the other peak correspond to the points of inflection. It is known, that the ordinate difference between this maximum and this minimum provides a measure of the concentration of the component causing the absorption band in the sample.

Normally the derivative spectra are recorded for different known concentrations of a looked-for component. The differences between maximum and minimum are measured and a calibration curve is designed from these differences and the appertaining known concentrations. It is found, that these calibration curves are very well linear and pass through the origin of coordinates, that is the differences are proportional to the concentrations. Then the concentration of the looked-for component can be obtained in an unknown sample from the ordinate difference between maximum and minimum of a derivative spectrum by this calibration curve.

This method is rather complicated. It requires the measurement and the evaluation of recorded spectra and is subjected to subjective effects.

It is the object of the invention to design a spectrophotometer for determining the concentration of a looked-for component of a sample out of a derivative spectrum, such that it provides directly a signal representing the concentration of the looked-for component.

According to the invention this object is achieved by
(d) means for defining two wave length values,
(e) memory means for storing signals of the detector arrangement,
(f) applying means, controlled by the wave length drive for applying the signals provided by the detector arrangement at the two defined wave length to the memory means and
(g) means for forming the difference of the two stored signals as measure of the concentration of the looked-for component in the sample.

It can be determined by a standard at which wave lengths the maximum and the minimum are located, which are obtained by the absorption band of the tested substance in the absorption spectrum. These two wave lengths are predetermined. The signals of the detector arrangement are stored in the memory means when passing through the wave lengths during the scanning of the spectrum of an unknown sample. When both stored signals are available after the spectrum has been scanned, a measure of the looked-for concentration is obtained by difference forming.

Further modifications of the invention are subject matter of the sub-claims.

An embodiment of the invention will now be described in greater detail with reference to the accompanying drawings:

FIG. 1 shows a typical graph of a derivative spectrum in the range of an absorption band.

FIG. 2 is a block diagram and illustrates the set-up of a spectrophotometer for determining the concentration of a looked-for component of a sample from a derivative spectrum.

FIG. 3 is a block diagram and illustrates the means for determining and defining the calibration factor.

FIG. 4 shows schematically an analog embodiment.

In FIG. 1 numeral 10 designates an absorption band, substantially in the form of bell-shaped curve, which has a first point of inflection 12 at $\lambda_1$, a second point of inflection 14 at $\lambda_2$ and a maximum 16 there between. The associated derivative spectrum 18 shows a positive peak 20 with a maximum 22 at $\lambda_1$ and a negative peak 24 with a minimum 26. The ordinate difference A between the maximum 22 and the minimum 26 provides a measure of the concentration of the component causing absorption band 10 in the sample. This ordinate difference A is determined with the spectrophotometer as described hereinbelow.

As indicated in FIG. 2, the spectrophotometer comprises a light source 28, from which a measuring light beam 30 passes through a monochromator 32 with a wave length drive 33, means 34 for producing a derivative spectrum and a sample 36 onto a detector arrangement 38. The detector arrangement produces a signal, which provides the derivative spectrum as function of the wave length defined by the wave length drive 33.

The means for producing the derivative spectrum can be optical means, for example of the type of the paper mentioned above in "Applied Optics" volume 7 (1968), 2031. They also can be part of the detector arrangement and the associated signal processing, where the derivative with respect to the wave length is provided by processing of the detector signal. Instead of the first derivative of the spectrum with respect to the wave length also a higher derivative may be formed. The expression "derivative spectrum" shall also comprise such possibilities.

Means 40 for defining two wave lengths $\lambda_1$ and $\lambda_2$ are provided. Numeral 42 designates memory means for storing signals of the detector arrangement 38. Applying means 46 are controlled by the wave length drive 33 as indicated by line 44, for applying the signals provided by the detector arrangement 38 at the two wave lengths $\lambda_1$ and $\lambda_2$ defined by the means 40, to the memory means 42.

The applying means can be, for example, micro switches, which are arranged to be operated by a cam rotatable with the wave length drive 33, and which are angularly adjustable by the means 40.

Furthermore means 48 for producing the difference of the two stored signals are provided as measure for the concentration of the looked-for component in the sample 36.

For producing a signal directly representing the concentration of the looked-for component in the sample 36, means 50 for defining a calibration factor K are provided, that is for producing a signal representing the calibration factor K. The difference is multiplied by the calibration factor K by multiplying means 52 connected to the outputs of the difference forming means 48 and the means 50 defining a calibration factor, such that the concentration is formed directly at an output 54. The difference forming means 48 also provide the value A of the difference, as indicated at 56.

The means 50 for defining a calibration factor K comprise means 58 for entering the known concentration value of a standard, means 60 for dividing the entered concentration value by the difference of the stored signals of the detector arrangement obtained by the standard and appearing at the output 56, and means 62 for storing the obtained quotient as calibration factor K for the following measurements.

FIG. 4 shows an analog embodiment.

The monochromator 32 comprising the wave length drive 33 closes one switch each 64 and 66, respectively, at two defined wave lengths $\lambda_1$ and $\lambda_2$. The switches 64 and 66 together form the "defining means" 40. Through the switches 64 and 66 a signal of the detector arrangement 38 appearing at an input 68 is applied either through a resistor 70 to a capacitor 72 or through a resistor 74 to a capacitor 76. The capacitor 72 is charged to the signal of the detector arrangement 38 at the wave length $\lambda_1$. The capacitor 76 is charged to the signal of the detector arrangement at the wave length $\lambda_2$. The capacitor voltages of the capacitors 72 and 76 are applied to the high impedance inputs of amplifiers 78 and 80, respectively, namely the capacitor 72 is applied to the non-inverting input of the amplifier 78 and the capacitor 76 is applied to the inverting input of the amplifier 80. The outputs of the amplifiers 78 and 80 are connected through summing resistors 82 and 84, respectively, to the input 86 of the multiplier 52, to the other input, of which the calibration factor K from the means 50 is applied.

The output 54 of the multiplier 52 is applied through a summing resistor 88 to an amplifier 90, together with a correcting voltage, which is adjusted by a potentiometer 92 and which is applied through a summing resistor 94 to an amplifier 90. The potentiometer 92 is energized by a voltage source 96. A zero point corrected output signal appears at an output 98. Thus it can be ensured, that the concentration of zero corresponds to the output signal of zero.

The arrangement discribed operates as follows:

First a standard is used, that is a sample 36, comprising the looked-for component in known concentration $C_{ST}$. With this standard the graph of the signal is recorded at the output of the detector arrangement 38 as a function of the wave length, for example by means of a conventional recorder (not illustrated). This results in a derivative spectrum, for example as set forth in curve 18 in FIG. 1. The wave lengths $\lambda_1$ and $\lambda_2$ are determined therefrom and entered by the means 40. The wave lengths $\lambda_1$ and $\lambda_2$ are often already known for known substances.

Then the known concentration $C_{ST}$ is entered by the means 58. A difference signal $A_{ST}$ results at the output 56 after the derivative spectrum has been scanned. The means 60 for the division form $$K = \frac{C_{ST}}{A_{ST}}$$

and store this value in the memory means 62. The multiplying means 52 provide correctly $$K \cdot A_{ST} = \frac{C_{ST}}{A_{ST}} \cdot A_{ST} = C_{ST}$$

at the output 54.

Then a sample 36 to be tested is inserted. During the scanning of the spectrum a difference A is obtained at the difference forming means 48, which difference multiplied by the calibration factor K mentioned above, provides the concentration c of the looked-for component, causing the absorption band 10.

We claim:

1. Spectrophotometer for determining the concentration of a looked-for component from a derivative spectrum; comprising:
    a monochromator having a wave length drive for scanning a wave length range;
    means for producing a derivative spectrum;
    a detector arrangement for producing a signal, which provides said derivative spectrum as a function of the wave length defined by said wave length drive;
    means for defining two wave length values;
    memory means for storing signals of said detector arrangement;
    applying means controlled by said wave length drive for applying said signals provided by said detector arrangement at the two defined wave lengths to said memory means;
    means for forming the difference of said two stored signals as measure of the concentration of said looked-for component in a sample;
    means for defining a calibration factor; and
    multiplying means for multiplying said difference by said calibration factor for producing a signal directly representing the concentration of said looked-for component in said sample.

2. Spectrophotometer as claimed in claim 1, wherein said means for defining said calibration factor includes:
    means for entering the known concentration value of a standard;
    means for dividing said entered concentration value by the difference obtained with the standard, of the stored signals of said detector arrangement; and
    means for storing said quotient as said calibration factor for subsequent measurements.

* * * * *